May 1, 1962 J. R. CECIL ET AL 3,032,700
STATIC EXCITATION SYSTEM FOR GENERATORS
Filed June 12, 1959
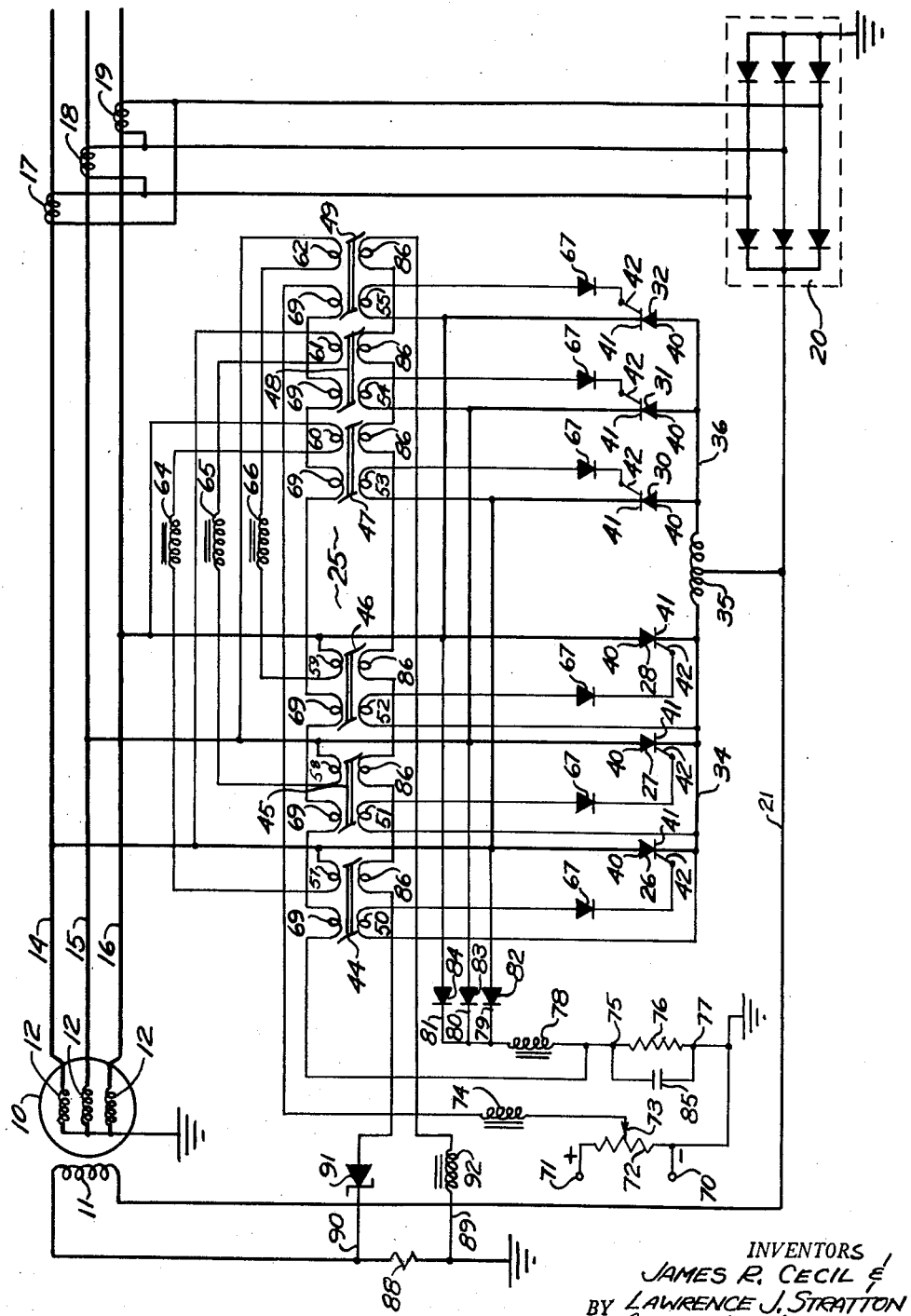
INVENTORS
JAMES R. CECIL &
BY LAWRENCE J. STRATTON
Bosworth, Sessions,
Herston & Knowles
ATTORNEYS United States Patent Office 3,032,700
Patented May 1, 1962

3,032,700
STATIC EXCITATION SYSTEM FOR GENERATORS
James R. Cecil, West Richfield, and Lawrence J. Stratton, Lyndhurst, Ohio, assignors, by mesne assignments, to The Siegler Corporation, Los Angeles, Calif., a corporation of Delaware
Filed June 12, 1959, Ser. No. 819,846
10 Claims. (Cl. 322—25)

This invention relates to an excitation system for alternating current generators and more particularly to a static excitation system of the type in which the excitation power is obtained from the output of the generator by means of current transformers and rectifiers.

Systems of this general type have been proposed, but prior systems have been subject to defects in operation that are particularly dangerous in connection with generators used in alternating current power systems of aircraft. These defects are accentuated in high duty machines in which the rated output of the machine cannot safely be exceeded except for very short periods of time. Specifically, with prior types of excitation systems, when a large part of the load on the machine is suddenly removed, serious over-voltage output may occur during the time that is required for the field of the generator to decay. Also, during the occurrence of high impedance line-to-line faults, the output current of the generator is large and the current transformers in conventional systems supply excessive excitation, resulting in serious over-voltages. Finally, upon the occurrence of a three-phase, high impedance fault, particularly when the generator temperature is low, i.e., shortly after the generator has been started, the large current output of the generator produces excessive excitation of the generator field and resulting high torque in the shaft of the generator. In conventional aircraft employing a constant speed drive between the prime mover and the generator, faults of this character can result in the destruction of the constant speed drive, this not only makes the generator inoperative but may ultimately make it necessary to stop the prime mover.

The general object of the present invention is the provision of a static excitation system in which the above noted defects are substantially eliminated. Other objects include the provision of an excitation system for alternating current machines in which the excitation is derived from current transformers on the output of the generator and in which the control of the excitation is effected through reliable and lightweight static components; the provision of such a system in which the response of the system to the occurrence of faults is extremely rapid, and the provision of a system which gives good regulation of the generator output voltage during normal operation of the generator.

Briefly, an excitation system embodying our invention comprises current transformers associated with the output buses of the generator and supplying excitation to the generator field in a known manner through a full wave rectifier. The excitation, however, is controlled by means of a voltage regulator embodying two groups of controlled rectifiers connected to the output terminals of the generator. The controlled rectifiers function during the normal operation of the generator to supplement the excitation supplied by the current transformers to the degree required by the conditions of operation of the generator and function during abnormal operation or the occurrence of a fault to accelerate the decay of the generator field when the load is removed and to prevent excessive excitation being supplied by the current transformers in the event of a fault that causes a high current to flow in one or more of the output lines of the machine. This last is accomplished by the action of the controlled rectifiers in dissipating the rectified output of the current transformers through the armature winding of the generator or elsewhere throughout the system.

Other objects and advantages of the invention will become apparent from the following description of a preferred form thereof, reference being made to the accompanying drawing. The essential characteristics are summarized in the claims.

The drawing is a wiring diagram of a preferred form of excitation system embodying our invention as applied to a three-phase synchronous generator.

Referring to the drawing, the generator indicated in general at 10 has a field winding 11 and an armature or output winding 12. The generator may be of any suitable construction; in normal practice the field windings are the rotor windings and the armature windings are the stator windings. The output of the generator is supplied to three buses 14, 15 and 16. In order to provide excitation power for the generator field, current transformers having secondaries 17, 18 and 19 are associated with the output buses 14, 15 and 16. The output of the transformers is rectified by a full wave rectifier 20 and the output of the rectifier is connected to the generator field 11 through the conductor 21. With nothing more, the current transformers and rectifiers would constitute an excitation system for the generator that would supply excitation to the generator field that would vary substantially directly with the current flowing in the output buses. Such an excitation system would have inherently all of the faults mentioned above.

In order to provide a complete excitation and voltage regulating system we employed a voltage regulator indicated in general at 25; the regulator being connected between the buses 14, 15 and 16 and the conductor 21. Voltage regulator 25 comprises a "positive" group of controlled silicon rectifiers made up of rectifiers 26, 27 and 28 having their anodes connected to buses 14, 15 and 16, respectively, and a "negative" group of controlled silicon rectifiers made up of rectifiers 30, 31 and 32, having their cathodes connected to buses 14, 15 and 16, respectively. The cathodes of the rectifiers 26, 27 and 28 in the positive group are connected by conductor 34 to a center tapped choke 35 and the anodes of the rectifiers 30, 31 and 32 in the negative group are connected to the other end of the choke 35 by a conductor 36.

The controlled silicon rectifiers are PNPN semi-conductors each having an anode 40, a cathode 41 and a gate 42. The rectifiers are normally non-conducting. Avalanche breakdown of the center junction is achieved by applying a signal to the gate, a very brief current pulse of 10 milliamperes at 1½ volts gate-to-cathode being sufficient. The amplitude of the current pulses is not critical, so long as it is sufficient to fire the rectifiers. Breakdown occurs at speeds that are almost instantaneous; after breakdown the voltage across the rectifiers is very low. An extremely small amount of power applied at the gate makes it possible to control the switching action of the rectifiers at very high rates of speed. When a rectifier is fired by applying appropriate current to the gate, the rectifier becomes conductive and continues to conduct until the forward voltage is removed; in this respect the device acts much in the manner of a thyratron. It can be made conductive during any part of the positive half cycle of the anode to cathode voltage and will remain conductive throughout the remainder of the positive half cycle or until it is turned off by the firing of another rectifier in the voltage regulator. Thus, by applying appropriate signal currents at the correct times to the gates 42 of the controlled rectifiers, the rectifiers of the positive group can be fired to supply additional excitation to the generator, or the rectifiers of the negative group can be fired to bleed off or divert substantially all or any required portion of the excitation current supplied by the current transformers 17, 18 and 19 and the rectifier 20.

In order to supply signal pulses at the correct instance to the gates 42 of the several controlled rectifiers, saturable pulse transformers 44, 45 and 46 are associated with the rectifiers 26, 27 and 28 of the positive group and similar transformers 47, 48 and 49 are associated with the rectifiers 30, 31 and 32 of the negative group. These transformers are essentially the same as the magnetic core devices described in the co-pending application of Lawrence J. Stratton and Keith M. Chirgwin, Serial No. 765,472, filed October 6, 1958, and they function in a manner essentially similar to that described in the aforesaid application. Each transformer has a toroidal core of square loop material and each core is preferably provided with four windings. On the cores of transformers 44, 45 and 46 there are output windings 50, 51 and 52 connected between the gates 42 of the rectifiers and the conductor 34. The transformers 47, 48 and 49 of the negative group similarly are provided with output windings 53, 54 and 55 connected between the gates 42 of the rectifiers of the negative group and their cathodes 41.

Each transformer has an input winding that is connected across two of the lines 14, 15 and 16 and is thus energized by the line to line voltage of the generator. On transformer 44 this winding is indicated at 57. Winding 57 is connected in series with a similar winding 60 on transformer 47 between output buses 14 and 16. On transformer 45 there is a winding 58 that is connected in series with winding 61 on transformer 48 between lines 14 and 15; on transformer 46 there is a winding 59 that is connected in series with a winding 62 on core 49 between lines 15 and 16. Chokes 64, 65 and 66 are connected in series with each pair of input windings.

The saturable pulse transformers are connected so that the cores are in a state of either negative saturation or positive saturation except when the algebraic sum of the ampere turns in the input windings on the cores is substantially equal to zero. An output pulse is generated in an output winding only when its associated core goes from one state of saturation to the opposite state of saturation. In the present arrangement small rectifiers 67 are inserted in the connections between the several output windings and the gates of the several controlled rectifiers so that a pulse is applied to the gate only when the cores of the transformers go from negative saturation to positive saturation and not when the change in magnetism is in the other direction. With this arrangement and if the cores were provided with only the input windings 57, 58, 59, 60, 61 and 62, output pulses would be generated by each transformer at a point 120° after the beginning of each positive half cycle of the voltage applied to the anodes of the controlled rectifiers. The 120° lag is present because line-to-line voltage lags the line-to-neutral voltage by 30° and the chokes 64, 65 and 66 give an additional lag of 90°. With the controlled rectifiers firing at 120° lag, the net output voltage of the rectifiers of each group will be zero.

In order to provide control so that the voltage regulator can either supply additional excitation to the generator or bleed off or divert all or any part of the excitation power supplied by the current transformers and the rectifier 20, each pulse transformer is provided with a bias winding 69. Bias windings 69 are all connected in series and in series with a voltage source that produces a positive bias when additional excitation is required and negative bias when it is desired to reduce or eliminate the excitation supplied by the current transformer. The bias voltage may be produced by any convenient source but preferably a simple arrangement such as that shown in the drawing is employed. This comprises a constant voltage source such as a D.C. source and a Zener diode (not shown) or other suitable constant D.C. voltage source, connected to the terminals 70 and 71 of the potentiometer 72. The adjustable contact 73 of the potentiometer 72 is connected through a choke 74 to one end of the series connected bias windings 69 while the other end of the series connected coils is connected to terminal 75 of resistor 76, the other terminal 77 of which is connected to ground. The purpose of the choke 74 is to absorb the voltage pulses that are generated in the bias windings 69 when the transformer cores go from one state of saturation to the other.

The voltage output of the generator is sensed through connections including a choke 78 and conductors 79, 80 and 81 leading to lines 14, 15 and 16, respectively, through rectifiers 82, 83 and 84. A capacitor 85 is connected across resistor 76; thus the voltage across resistor 76 appearing at point 75 is proportional to the voltage of the highest phase of the output of the generator. With this arrangement, the voltage across resistor 76 is balanced against the voltage between the movable contact 73 of the potentiometer 72 and ground. In normal operation the apparatus is designed so that a minor amount of excitation power is supplied by the voltage regulator; that is the voltage at the adjustable terminal 73 at the potentiometer 72 is normally slightly more positive than the voltage at terminal 75 and the windings 69 provide a slight amount of positive bias that advances the firing point of the rectifiers of the positive group ahead of 120°. If the voltage of the generator is reduced or falls off, then the voltage at terminal 75 becomes less positive, a greater amount of positive bias is supplied to the windings 69 of each of the cores and the firing of the cores is further advanced so that increased excitation is supplied. It is to be noted that applying increased positive bias to the bias windings of the transformers 47, 48 and 49 that control the rectifiers of the negative group further retards the firing of these rectifiers so that they remain essentially non-conductive. The choke 35 smooths the output of the rectifiers and assists in absorbing any undesired output of the rectifiers of the group that is fired with a lag of more than 120°.

If the generator output increases, then the voltage at terminal 75 becomes more positive, i.e., less negative, with respect to the voltage at the adjustable contact 73, less current flows through the bias windings 69 and the firing point of the transformers of the positive group is retarded more nearly to the 120° point. As noted above, in normal operation, there is ordinarily a slight positive bias current flowing in winding 69 so that a portion of the excitation power is supplied by means of the voltage regulator.

Considering the abnormal condition mentioned above, assume that either because of a fault or for some other reason the load on the machine is suddenly reduced, for example by removing from the circuit an apparatus that consumes a large amount of power. Under such circumstances, with conventional excitation systems the machine would immediately begin to generate an excessively high voltage because of the high excitation of the field; the generation of this voltage would continue for an appreciable period of time, gradually falling off as the field of the machine decayed. The high voltage, however, might well persist long enough to damage other power consuming apparatus connected to the output of the generator. With the present system, as soon as the voltage increases beyond the pre-determined value, the voltage at point 75 becomes positive with respect to the voltage at contact 73. The direction of flow of current in the bias windings 69 is reversed and the firing of the rectifiers in the negative group is advanced while the firing of the rectifiers in the positive group is further retarded beyond the 120° point. Advancing the firing of the rectifiers 30, 31 and 32 of the negative group permits current to flow from the line 21 to the output buses 14, 15 and 16 and in effect applies a negative excitation voltage to the generator field which accelerates the decay of the field magnetism so that within a very few cycles the field magnetism has been reduced to a value such that there is no excessive or dangerous over-voltage.

Another type of difficulty with prior systems results from the supplying of excessive excitation current by the current transformers. Assume, for example, that there is a high impedance line-to-line fault. Such a fault would result in greatly increased output of the current transformers which, in the absence of the arrangement of the present invention, would result in over-excitation of the generator field and an increase in the generator output. With the present circuit, however, the excitation is reduced by causing the rectifiers of the negative group to conduct, thus diverting the output of the current transformers back to the line. When such a fault occurs the voltage of the two lines involved in the fault may be reduced but the excitation, which is increased because of the increased output of the current transformers associated with those lines, would either maintain or increase the voltage of the unaffected line. The inductance-capacitance network constituted by the choke 78 and the capacitor 85 makes the voltage appearing across the resistor 76 proportional to the voltage of the highest phase of the generator; the increased voltage at point 75 reduces the positive bias current and if the excessive voltage in the line unaffected by the fault becomes great enough, a negative bias voltage is applied to the pulse transformers through the bias windings 69. This causes the controlled rectifiers 30, 31 and 32 of the negative group to fire to bleed off excitation current that otherwise would be supplied by the current transformers; thus preventing over-excitation of the generator field.

A third difficulty, which is closely related to the type just mentioned, results when there is a three-phase high impedance fault. With the present system the current transformers tend to supply excessive excitation but the voltage regulator, sensing the output voltage of the machine, maintains the output voltage at normal levels. In many installations this is sufficient to provide adequate protection to the equipment; however, for some services this protection may be insufficient because the excitation supplied by the current transformer may impose too great a torque load on the machine, particularly when the machine is cold and the resistance of the field is relatively low. To provide additional protection for this circumstance, negative bias windings 86 may be provided on each of the saturable pulse transformers 44, 45, 46, 47, 48 and 49. These windings are all connected in series and are arranged to apply negative bias to the cores of the transformers whenever the excitation current applied to the generator field exceeds a pre-determined value. This may be accomplished, for example, by connecting a low resistance shunt 88 between the generator field and ground. The voltage developed across the shunt is applied to the windings 86 through conductors 89 and 90. In order to prevent any substantial currents from flowing through the windings 86 except in the event of excessive field excitation, a Zener diode 91 is connected in the conductor 90. So long as the voltage across the shunt 88 is below the breakdown voltage of the Zener diode the windings 86 have not effect. However, when this voltage exceeds the breakdown voltage of the Zener diode and the diode begins to conduct, then the current flowing through the windings 86 on each of the saturable pulse transformers retards the firing of the rectifiers of the positive group and advances the firing of the rectifiers in the negative group in proportion to the amount that the voltage across the shunt exceeds the breakdown voltage of the Zener diode. Under such circumstances, if the fault is such that excessive excitation current is supplied by the current transformers even though the voltage output of the machine does not exceed normal, then the controlled rectifiers of the negative group become conductive and bleed off the output of the current transformers, thereby reducing the excitation current to a safe value and preventing the imposition of a dangerously large torque load on the generator shaft.

Conductor 89 includes a choke 92 which absorbs the voltage pulses that otherwise would be generated in the windings 86 when the cores go from one state of saturation to the other under the influence of the line current.

It will be evident that other means can be employed to control the energization of the windings 86. For example, if the fluid pressure developed in the hydraulic drive for the generator should become excessive, the pressure could be utilized to actuate a relay to energize the coils 86 from a direct current source. Such an arrangement would directly prevent the building up of excessive torque in the generator.

From the foregoing description of a preferred form of the invention, it will be evident that we have provided an excitation system for alternating current generators embodying current transformers and static components in which the excitation is regulated accurately and with almost no lag to maintain the output voltage at the correct value. With our system, in the event load is suddenly removed from the system, the generator field is forced to decay rapidly, thus preventing over-voltage. Furthermore, upon the occurrence of faults that would otherwise cause excessive excitation of the generator by the current transformer, the controlled rectifiers function to bleed off excitation current in the amount required to provide correct excitation without excessive excitation. Also, the system provides means for preventing excessive excitation and thereby limiting the torque imposed by the generator on the drive.

All of these advantages are obtained by means of simple, lightweight and reliable static components. The system operates with a high degree of efficiency and accuracy of control and is particularly adapted to aircraft power systems where fast-acting, lightweight and reliable controls are required.

We claim:

1. In a static excitation system for alternating current generators having a field winding and connected to output conductors, the combination of a current transformer having a secondary inductively associated with one of said output conductors for providing an alternating current supply proportional to the current in said associated output conductor, rectifier means in circuit with said secondary for rectifying said alternating current supply, circuit means connecting said rectifier means to said field winding for supplying direct current excitation to said field winding, circuit means connecting said field winding and one of said output conductors and including an inversely connected pair of controlled rectifiers for providing a controlled flow of direct current in either direction between said field winding and one of said output conductors, means responsive to a condition of operation of said generator for controlling the conduction of said controlled rectifiers in accordance therewith.

2. In a static excitation system for alternating current generators having a field winding and connected to output conductors, the combination of a current transformer having a secondary inductively associated with one of said output conductors for providing an alternating current supply proportional to the current in said associated output conductor, rectifier means in circuit with said secondary for rectifying said alternating current supply, circuit means connecting said rectifier means to said field winding for supplying direct current excitation to said field winding, and circuit means connecting said field winding and one of said output conductors, said circuit means including controllable rectifier means for providing a controlled flow of direct current in either direction through said circuit means whereby said circuit means is capable of supplementing the excitation current supplied to said field winding by said current transformer and said rectifier means and of diverting direct current from said field winding so as to control the excitation of said generator, and means responsive to the output voltage of said generator and to the excitation current in said field winding for controlling said controllable rectifier means.

3. In a static excitation system for alternating current generators having a field winding and connected to output conductors, the combination of a current transformer having a secondary inductively associated with one of said output conductors for providing an alternating current supply proportional to the current in said associated output conductor, rectifier means in circuit with said secondary for rectifying said alternating current supply, circuit means connecting said rectifier means to said field winding for supplying direct current excitation to said field winding, and circuit means connecting said field winding and one of said output conductors, said circuit means including controllable rectifier means for providing a controlled flow of direct current in either direction through said circuit means whereby said circuit means is capable of supplementing the excitation current supplied to said field winding by said current transformer and said rectifier means and of diverting direct current from said field winding so as to control the excitation of said generator, and means responsive to the excitation current in said field winding for controlling said controllable rectifier means.

4. In a static excitation system for alternating current generators having a field winding and connected to output conductors, the combination of a current transformer having a secondary inductively associated with one of said output conductors for providing an alternating current supply proportional to the current in said associated output conductor, rectifier means in circuit with said secondary for rectifying said alternating current supply, circuit means connecting said rectifier means to said field winding for supplying direct current excitation to said field winding, and circuit means connecting said field winding and one of said output conductors, said circuit means including controllable rectifier means for providing a controlled flow of direct current in either direction through said circuit means whereby said circuit means is capable of supplementing the excitation current supplied to said field winding by said current transformer and said rectifier means and of diverting direct current from said field winding so as to control the excitation of said generator, and means responsive to the output voltage of said generator for controlling said controllable rectifier means.

5. In a static excitation system for alternating current generators having a field winding and connected to output conductors, the combination of a current transformer having a secondary inductively associated with one of said conductors for providing an alternating current supply proportional to the current in said associated output conductor, rectifier means in circuit with said secondary for rectifying said alternating current supply, circuit means connecting said rectifier means to said field winding for supplying direct current excitation to said field winding, a regulator circuit connected between said field winding and said output conductors, said regulator circuit comprising a positive group of controlled rectifiers and a negative group of controlled rectifiers, each group containing as many rectifiers as there are output phases of the generator, said controlled rectifiers each having an anode, a cathode and a gate, said anodes of the rectifiers in the positive group and said cathodes of the rectifiers in the negative group each being connected to one of said output conductors, a center tapped choke having its center tap connected to said field winding, said cathodes of the rectifiers in the positive group being connected in parallel to each other and to one end of said center tapped choke, said anodes of the rectifiers in the negative group being connected in parallel to each other and to the other end of said center tapped choke, means for controlling the conduction of said controlled rectifiers whereby said positive group of controlled rectifiers permits a controlled amount of current to flow from said output conductors to the field winding to supplement the excitation current supplied by said current transformers and said rectifier means and said negative group of controlled rectifiers permits a controlled flow of current from said field winding to said output conductors to reduce the excitation current in said field winding, said controlling means comprising a saturable pulse transformer associated with each of said controlled rectifiers, each saturable pulse transformer having an output winding connected to the gate of its associated controlled rectifier for supplying firing pulses to said gate, each transformer having an input winding connected across two of said output conductors of said generator, and each transformer having a bias winding for supplying positive or negative bias to said cores of said transformers to advance or retard the firing thereof, and a voltage regulator responsive to variations in the voltage of the highest phase of the output of said generator for controlling the energization of said bias winding in accordance with the highest phase voltage variations.

6. In a static excitation system for alternating current generators having a field winding and connected to output conductors, the combination of a current transformer having a secondary inductively associated with one of said conductors for providing an alternating current supply proportional to the current in said associated output conductor, rectifier means in circuit with said secondary for rectifying said alternating current supply, circuit means connecting said rectifier means to said field winding for supplying direct current excitation to said field winding, a regulator circuit connected between said field winding and said output conductors, said regulator circuit comprising a positive group of controlled rectifiers and a negative group of controlled rectifiers, each group containing as many rectifiers as there are output phases of the generator, said controlled rectifiers each having an anode, a cathode and a gate, said anodes of the rectifiers in the positive group and said cathodes of the rectifiers in the negative group each being connected to one of said output conductors, a center tapped choke having its center tap connected to said field winding, said cathodes of the rectifiers in the positive group being connected in parallel to each other and to one end of said center tapped choke, said anodes of the rectifiers in the negative group being connected in parallel to each other and to the other end of said center tapped choke, means for controlling the conduction of said controlled rectifiers whereby said positive group of controlled rectifiers permits a controlled amount of current to flow from said output conductors to the field winding to supplement the excitation current supplied by said current transformers and said rectifier means and said negative group of controlled rectifiers permits a controlled flow of current from said field winding to said output conductors to reduce the excitation current in said field winding, said controlling means comprising a saturable pulse transformer associated with each of said controlled rectifiers, each saturable pulse transformer having an output winding connected to the gate of its associated controlled rectifier for supplying firing pulses to said gate, each transformer having an input winding connected across two of said output conductors of said generator, and each transformer having a bias winding for supplying a positive or negative bias to said cores of said transformers to advance or retard the firing thereof, and a voltage regulator responsive to variations in the voltage of the output of said generator for controlling the energization of said bias winding in accordance with the output voltage variations, and a negative bias winding for supplying negative bias to said saturable pulse transformers to retard the firing of the rectifiers in the positive group and advance the firing of the rectifiers in the negative group and means responsive to the excitation current supplied to said field winding for energizing said negative bias winding when the excitation current exceeds a predetermined amount.

7. In a static excitation system for an alternating current generator having a field winding and connected to output conductors, the combination of current transformers each having a secondary inductively associated with one of the output conductors of the generator for providing an alternating current supply proportional to the current flowing in its associated output conductor, polyphase full-wave rectifier means in circuit with said secondaries for rectifying said alternating current supplies, circuit means connecting said rectifier means to said field winding for supplying direct current excitation to said field winding, and a regulator means connected between said field winding and the output conductors of said generator for providing a current conducting path therebetween parallel to the path provided by said current transformers and said rectifier means, said regulator means comprising a positive group of controlled rectifiers and a negative group of controlled rectifiers, each group containing as many rectifiers as there are output phases of said generator, said controlled rectifiers each having an anode, a cathode and a gate, said anodes of said controlled rectifiers in the positive group and said cathodes of the rectifiers in the negative group being connected to said output conductors, a center tapped choke having its center tap connected to said field winding, said cathodes of the rectifiers of the positive group being connected in parallel to each other and to one end of said center tapped choke, said anodes of the rectifiers in the negative group being connected in parallel to each other and to the other end of said center tapped choke, means for controlling the conduction of said controlled rectifiers to permit a controlled flow of current through said positive group of controlled rectifiers from said output conductors to said field winding to supplement the excitation current supplied to said field winding by said current transformers and said rectifier means and to permit a controlled current flow through said negative group of controlled rectifiers from said field winding to said output conductors to reduce the excitation supplied to said field winding, said controlling means comprising a saturable pulse transformer associated with each of said controlled rectifiers, each saturable pulse transformer having an output winding connected to said gate of its associated rectifier for supplying firing pulses to said gate, each transformer having an input winding connected across two of said output conductors and a choke in series with said input winding whereby the current in said input winding lags the line-to-neutral voltage of the phase with which it is associated by 120°, each transformer having a bias winding for supplying a positive and a negative bias to the cores of said transformers to advance and to retard the firing thereof, a voltage regulator for controlling the energization of said bias winding, said voltage regulator being responsive to the highest phase of the output of said generator, each transformer having a negative bias winding for supplying negative bias to said saturable pulse transformers to retard the firing of the rectifiers in the positive group and advance the firing of the rectifiers in the negative group and means for energizing said negative bias winding when the excitation current of said field exceeds a predetermined amount, said energizing means comprising a shunt in the field circuit of said generator, said negative bias winding being connected in series across said shunt and means comprising a Zener diode for permitting current flow through said negative bias windings only when the voltage drop across said shunt exceeds a predetermined minimum.

8. In a static excitation system for an alternating current generator having a field winding and connected to output conductors, the combination of means for supplying excitation current to said field and means for subtracting from the excitation current supplied to said field thereby comprising a group of controlled rectifiers containing as many rectifiers as there are output phases of the generator, said rectifiers each having an anode and a cathode and a gate, said cathodes of each of said rectifiers connected to one of the output conductors of the generator, said anodes of the rectifiers being connected in parallel to each other and to said generator field, and means for controlling the conduction of said rectifiers to provide a controlled flow of current from said field winding to said output conductors tending to reduce the excitation furnished by said supplying means to said field.

9. In a static excitation system for an alternating current generator having a field winding and connected to output conductors, the combination of means for supplying excitation current to said field and means for subtracting from the excitation current supplied to said field thereby comprising a group of controlled rectifiers containing as many rectifiers as there are output phases of the generator, said rectifiers each having an anode and a cathode and a gate, said cathodes of each of said rectifiers connected to one of the output conductors of the generator, said anodes of the rectifiers being connected in parallel to each other and to said generator field, and means for controlling the conduction of said rectifiers to provide a controlled flow of current between said field winding and said output conductors tending to subtract from the excitation supplied to said field, said controlling means comprising a saturable pulse transformer associated with each of said controlled rectifiers, each saturable pulse transformer having an output winding connected to the gate of its associated controlled rectifier for supplying firing pulses thereto, an input winding connected across two of said output conductors of said generator, and a bias winding for supplying bias to said saturable pulse transformers for phase displacing the pulses supplied to said gates of said controlled rectifiers with respect to the anode-cathode potential applied to said controlled rectifiers in a direction tending to advance the firing of said rectifiers and means for energizing said bias winding when the excitation current in said field winding exceeds a predetermined amount.

10. In a static excitation system for an alternating current generator having a field winding and connected to output conductors, the combination of means for supplying excitation current to said field and means for subtracting from the excitation current supplied to said field thereby comprising a group of controlled rectifiers containing as many rectifiers as there are output phases of the generator, said rectifiers each having an anode and a cathode and a gate, said cathodes of each of said rectifiers connected to one of the output conductors of the generator, said anodes of the rectifiers being connected in parallel to each other and to said generator field, and means for controlling the conduction of said rectifiers to provide a controlled flow of current between said field winding and said output conductors tending to subtract from the excitation supplied to said field, said controlling means comprising a saturable pulse transformer associated with each of said controlled rectifiers, each saturable pulse transformer having an output winding connected to the gate of its associated controlled rectifier for supplying firing pulses thereto, an input winding connected across two of said output conductors of said generator, and a bias winding for supplying bias to said saturable pulse transformers for phase displacing the pulses supplied to said gates of said controlled rectifiers with respect to the anode-cathode potential applied to said controlled rectifiers in a direction tending to advance the firing of said rectifiers and means for energizing said bias winding when the excitation current in said field winding exceeds a predetermined amount comprising a shunt in the field circuit of the generator, said bias windings being connected in series with each other across said shunt and means for permitting current flow through said bias windings only when the voltage drop across said shunt exceeds a predetermined minimum.

References Cited in the file of this patent
UNITED STATES PATENTS 1,872,681     Crago ------------------ Aug. 23, 1932